United States Patent
Mouri et al.

[11] Patent Number: 5,803,708
[45] Date of Patent: Sep. 8, 1998

[54] DAMPING DEVICE FOR A ROTATING MACHINE

[75] Inventors: Yasushi Mouri; Yoshikuni Kohno, both of Hiroshima, Japan

[73] Assignee: Mitsubishi Heavy Industries, Ltd., Tokyo, Japan

[21] Appl. No.: 807,259

[22] Filed: Mar. 3, 1997

[30] Foreign Application Priority Data

May 30, 1996 [JP] Japan .................................. 8-136436

[51] Int. Cl.⁶ .................................................. F01D 3/04
[52] U.S. Cl. .......................................... 415/104; 415/107
[58] Field of Search .................................. 415/104, 107; 188/378

[56] References Cited

U.S. PATENT DOCUMENTS

| | | | |
|---|---|---|---|
| 3,989,409 | 11/1976 | Ioannesian | 415/107 |
| 4,475,869 | 10/1984 | Davies | 415/107 |
| 5,127,792 | 7/1992 | Katsuta et al. | 415/107 |
| 5,531,564 | 7/1996 | Anttonen et al. | 415/104 |

*Primary Examiner*—John T. Kwon
*Attorney, Agent, or Firm*—Michael N. Meller

[57] ABSTRACT

A damping device is provided for damping the vibration of a rotatable shaft. The shaft has a shaft end portion and a detachable thrust collar. The thrust collar has an elongated portion which extends in the direction of the axis of the rotatable shaft and is hollow. Further, the elongated portion overhangs the shaft end portion. The damping device also has a stationary portion which is associated with the elongated portion of the thrust collar.

4 Claims, 5 Drawing Sheets

DAMPING DEVICE FOR A ROTATING MACHINE

BACKGROUND OF THE INVENTION

1. Field of the Invention

The present invention relates to a damping device to be applied for purpose of damping shaft vibration of a rotating machine, such as a compressor, a turbine, etc.

2. Description of the Prior Art

In a high speed rotating machine, there occurs a problem that a large shaft vibration, such as an unstable vibration due to an exciting force caused by fluid, vibration due to an unbalance existing or occurring in a rotating system, etc., is generated so that operation is interrupted. Conventionally, there is considered a method in which, not relying upon a damping of a bearing portion only, a damping device is provided at a portion other than bearings so that vibration is suppressed.

In such damping device, machine oil is used as a medium and it is convenient that a damping device is provided close to bearings which use lubricating oil, hence ① a damping device is provided at a seal portion adjacent to the machine inner side of the bearings or ② a damping device is provided at a terminal end portion of thrust bearings adjacent to the machine outer side.

First, an example of the above ① in which a damping device is provided at a seal portion is described with reference to FIG. 3. Numeral 1 designates a shaft as a rotating object, numeral 10 designates a bearing device and numeral 40 designates a sealing device. In the bearing device 10, numeral 11 designates an annular bearing metal, numeral 12 designates an annular bearing housing which supports said bearing metal 11 and numeral 25 designates a bearing stand which supports said bearing housing 12. Numeral 15 designates an oil film formed between the inner circumferential face of said bearing metal 11 and the outer circumferential face of said shaft 1, and by this bearing device 10, the shaft 1 is supported rotatably.

In said sealing device 40, numeral 41 designates a movable damping ring contained within an annular groove of a seal housing 33, which movable damping ring 41 is supported by a seal flange 34 so as to be allowed to move only in the radial direction by a rotation set pin 43. Numeral 46 designates an outer annular gap formed between the outer circumferential face of said movable ring 41 and the inner circumferential face of said annular groove, numeral 45 designates an inner annular gap formed between the inner circumferential face of an inner hole of said movable ring 41 and the outer circumferential face of said rotating object 1 passing through said inner hole and numeral 42 designates an O-ring interposed between each side end portion of said movable ring 41 and the seal housing 33.

Incidentally, said outer annular gap 46 is formed by a rotating object centering action of the bearing device 10, hence the movable damping ring 41 is not supported other than by the rotation set pin 43.

Next, function of the sealing device of rotating object shown in FIG. 3 as so constructed is described concretely. The inner annular gap 45 formed between the inner circumferential face of the inner hole of the movable damping ring 41 and the outer circumferential face of the shaft 1 passing through said inner hole is sectioned into a plurality of arcuate gap portions and each said arcuate gap portion is formed in a wedge shape which becomes narrower gradually toward the downstream side in the rotational direction of the shaft 1.

As the shaft 1 rotates, a sealing fluid in this arcuate gap portion makes flow movement toward the gap narrower portion, thereby a wedge action arises in said sealing fluid so that said sealing fluid becomes a fluid film having a very high rigidity.

On the other hand, in the outer annular gap 46 formed between the outer circumferential face of the movable damping ring 41 and the inner circumferential face of the annular groove, a sealing fluid film for damping the vibration of the shaft 1 by a squeezing action is formed.

In the damping device having such a construction, the vibration of the shaft 1 is conveyed to the fluid film of high rigidity formed in said inner annular gap 45 and to the sealing fluid film formed in said outer annular gap 46 via the movable damping ring 41 which is movable in the radial direction and is suppressed effectively.

Said example in the prior art is disclosed by the Japanese patent publication No. Hei 6(1994)-60692 (U.S. Pat. No. 4,660,838).

An example of the above ② in which a damping device is provided at terminal end portion of thrust bearings is described with reference to FIG. 4. Numerals 1' to 3' compose a rotating object in which a thrust collar 2' is fixed to a shaft 1' by a set screw 3', and numeral 10 designates a bearing device and numeral 60 designates a thrust bearing device. The construction of said bearing device 10 is same as that shown in FIG. 3.

In said thrust bearing device 60, numeral 61 designates a thrust bearing metal assembly, numeral 62 designates a thrust bearing housing which supports the metal assembly 61, numeral 71' designates a movable damping ring and numeral 63' designates a damper housing which contains the movable ring 71'. Numerals 72', 73', 75' and 76' designate the part corresponding to the O-ring 42, the rotation set pin 43, the annular gaps 45 and 46, respectively, of FIG. 3.

In this thrust bearing device shown in FIG. 4, the movable damping ring 71', the O-ring 72', the rotation set pin 73', the inner annular gap 75' and the outer annular gap 76' function likewise the movable ring 41, the O-ring 42, the rotation set pin 73, the inner annular gap 45 and the outer annular gap 46, respectively, described in FIG. 3.

And vibration being conveyed to the fluid film of high rigidity formed in the inner annular gap 75' and to the sealing fluid film formed in the outer annular gap 76', the vibration of the rotating object 1 is suppressed effectively.

In said damping device in the prior art shown in FIG. 3, there is a disadvantage that it is not applicable to a rotating machine having a type of seal in which oil is not used, such as a labyrinth seal, a gas seal, etc.

Further, in said damping device in the prior art shown in FIG. 4, there are such disadvantages that (i) the shaft end portion of the rotating object being elongated, the weight of the overhanging portion is added, thereby the vibration of the rotating object becomes generative rather easily and (ii) the diameter of the rotating object is necessarily reduced toward the shaft end so that the diameter of the damper becomes smaller, and an enough damping force cannot be obtained.

In order to solve the problem mentioned in (ii) above, it is possible that a sleeve is fitted to the shaft end so as to enlarge the diameter of the damper portion, but the weight of the overhanging portion increases by the weight of this sleeve and the problem mentioned in (i) above is rather worsened, thus the problem as a whole cannot be dissolved.

SUMMARY OF THE INVENTION

It is therefore an object of the present invention to provide a damping device, having a large damping effect, which is applicable to a rotating machine having a type of seal not only of an oil seal but also of other types and is also applicable to an existing rotating machine easily.

In order to attain said object, in a damping device according to the present invention, an end portion of a thrust collar fitted to a rotating object is elongated to the direction of a shaft end so as to form a damper fitting portion. This elongated portion is hollow and is fitted to the shaft in a form overhanging from the end portion of the rotating object, and a stationary side of the damping device is associated therewith.

In the damping device as so constructed according to the present invention, a damper having a large diameter can be associated with the shaft end without largely increasing the weight of the overhanging portion.

Further, in the damping device according to the present invention, while the construction of the stationary side of the damping device fitted to the elongated portion of the thrust collar is same as that of a conventional one, a diameter of the damper can be made larger, thereby a larger damping force can be obtained as compared with the conventional damping device, and a more effective damping action can be realized.

FIG. 5 shows effect of damping action of a conventional damping device and of a damping device according to the present invention. It is found that, by fitting a damping device to a same rotating object, a large damping of vibration can be obtained and that, by a damping device according to the present invention, a damping effect which is equivalent to or larger than a conventional damping device can be obtained.

DESCRIPTION OF THE PREFERRED EMBODIMENTS

Figure 1:
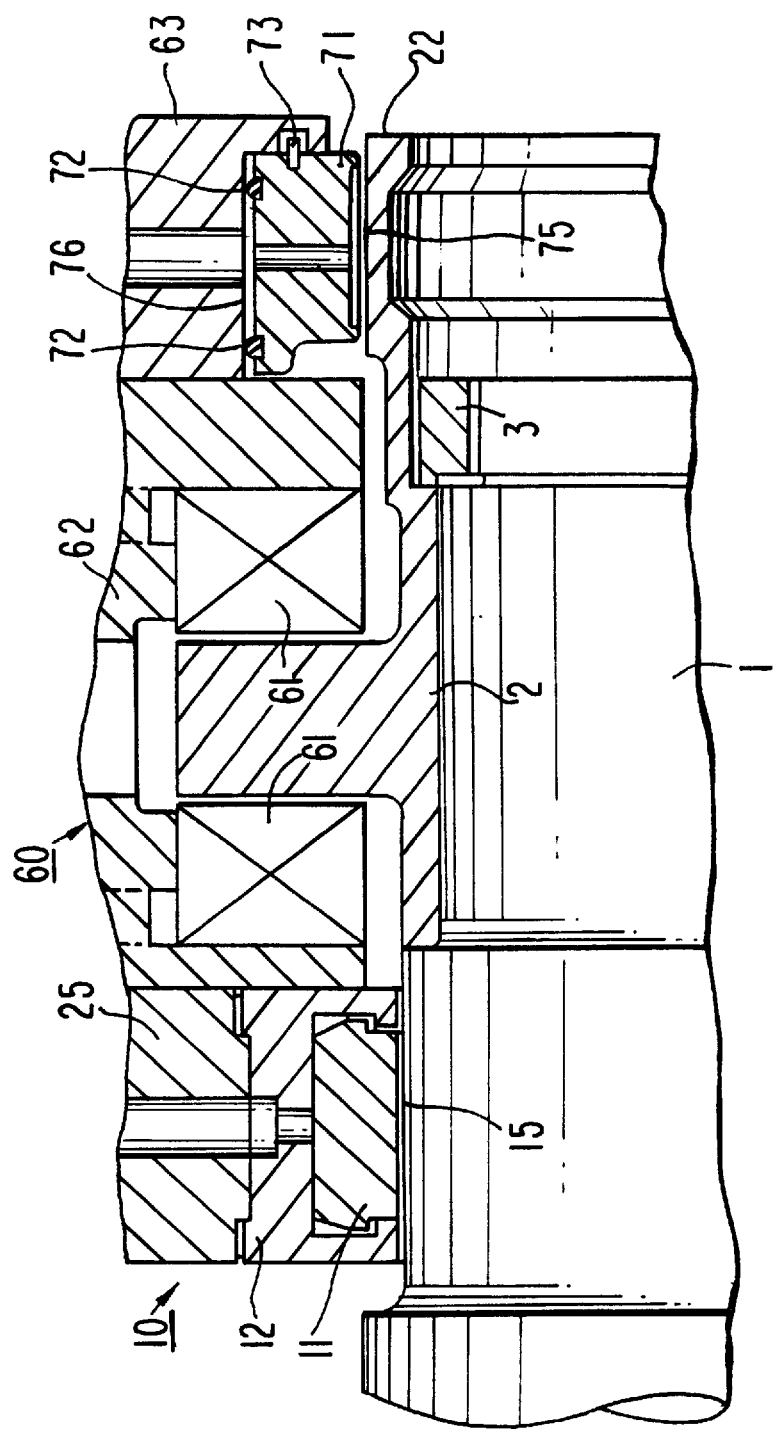
FIG. 1 is a sectional view of a damping device of a preferred embodiment according to the present invention.
Figure 3:
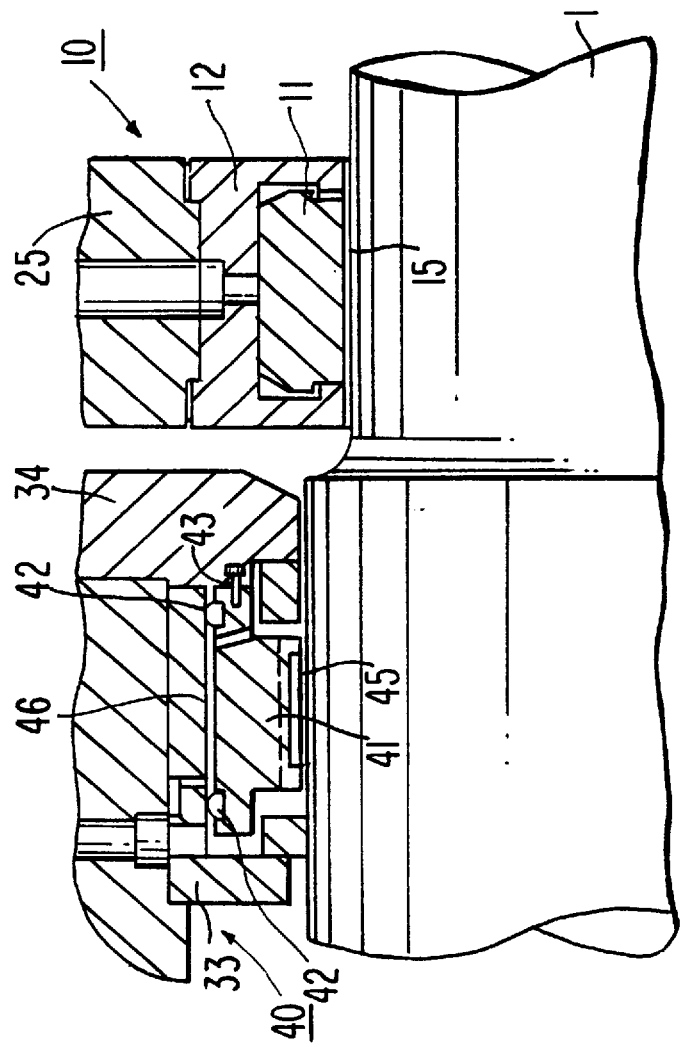
FIG. 3 is a sectional view of a damping device fitted to a rotating object seal portion in the prior art.
Figure 4:
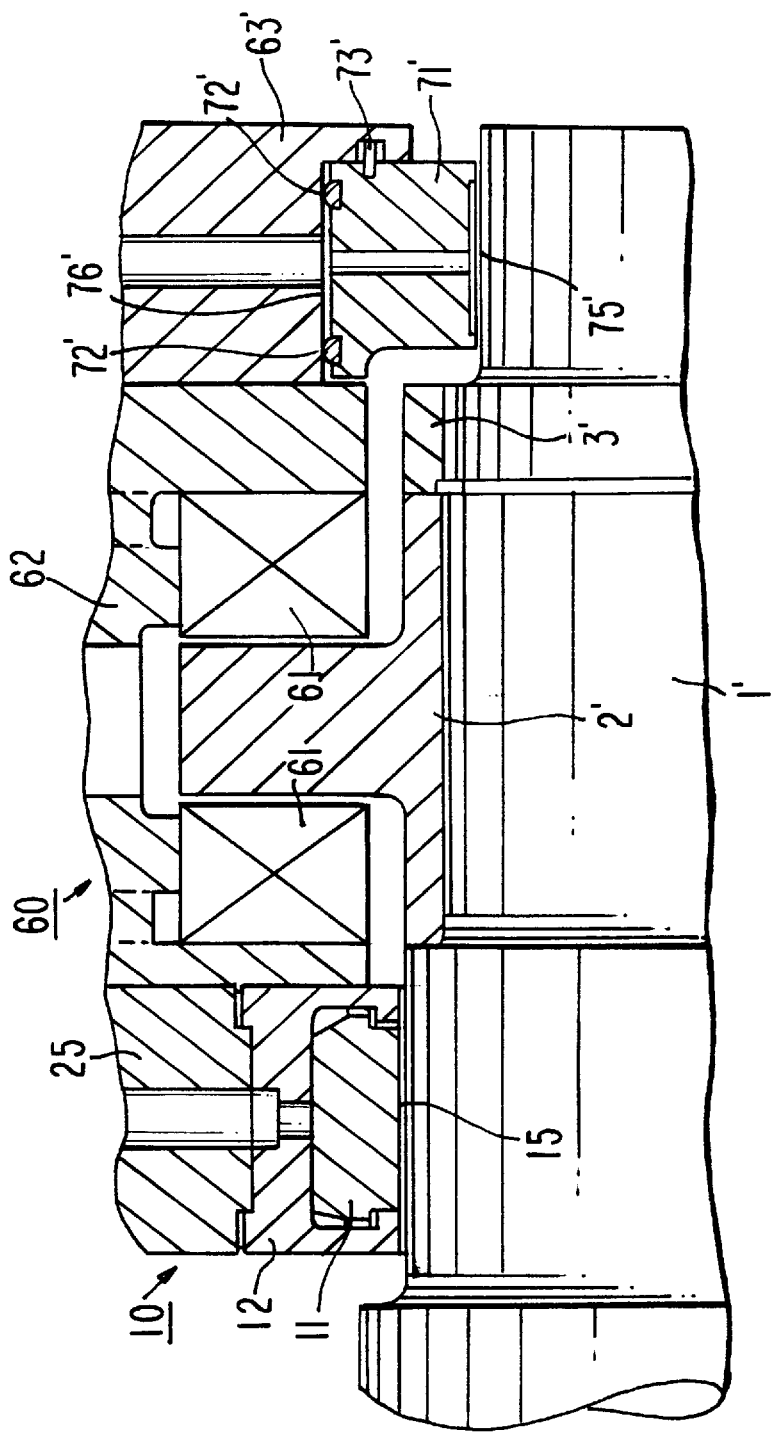
FIG. 4 is a sectional view of a damping device fitted to a thrust bearings terminal end portion in the prior art.
Figure 5:
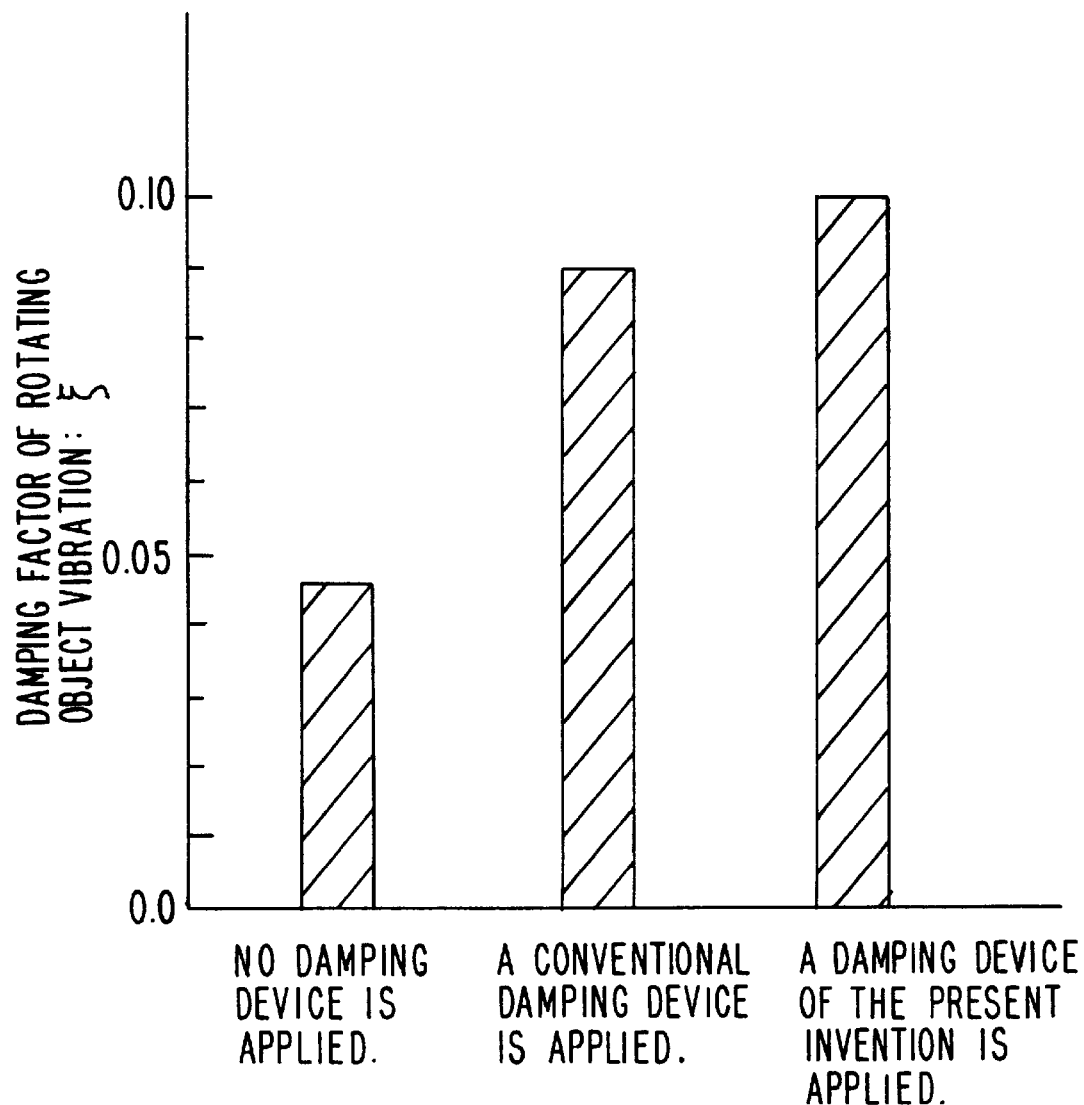
FIG. 5 is a graph showing effect of damping action of a damping device in the prior art and of a damping device according to the present invention.

Herebelow, a damping device of a rotating object according to the present invention is described concretely based on a preferred embodiment shown in FIG. 1. In FIG. 1, a part of same construction as that of a conventional damping device shown in FIG. 3 or 4 is given a same numeral for simplicity of description and a repeated description thereon is omitted.

In FIG. 1, a shaft 1, a thrust collar 2 and a set screw 3 compose a rotating object. Numeral 10 designates a bearing device and numeral 60 designates a thrust bearing device. The thrust collar 2 is fixed to the shaft 1 by the set screw 3.

At the thrust collar 2, an elongated portion 22 which is hollow and overhangs from an end portion of the shaft 1 is formed. The elongated portion 22 is larger in the outer diameter than the end portion of the shaft 1. The thrust collar 2 is integrated to the shaft 1 by an interference fit, wherein, as mentioned above, the set screw 3 is fitted so that the interference fit between the thrust collar 2 and the shaft 1 may not loosen. Construction of the bearing device 10 is same as that of the bearing device in the prior art shown in FIG. 3 and description thereon is omitted.

In the thrust bearing device 60, numeral 61 designates a thrust bearing metal assembly, numeral 62 designates a thrust bearing housing which supports the metal assembly 61, numeral 71 designates a movable damping ring and numeral 63 designates a damper housing which contains the movable ring 71. An O-ring 72, a rotation set pin 73 and annular gaps 75 and 76 are the part corresponding to the numerals 42, 43, 45 and 46, respectively, of FIG. 3.

Figure 2:
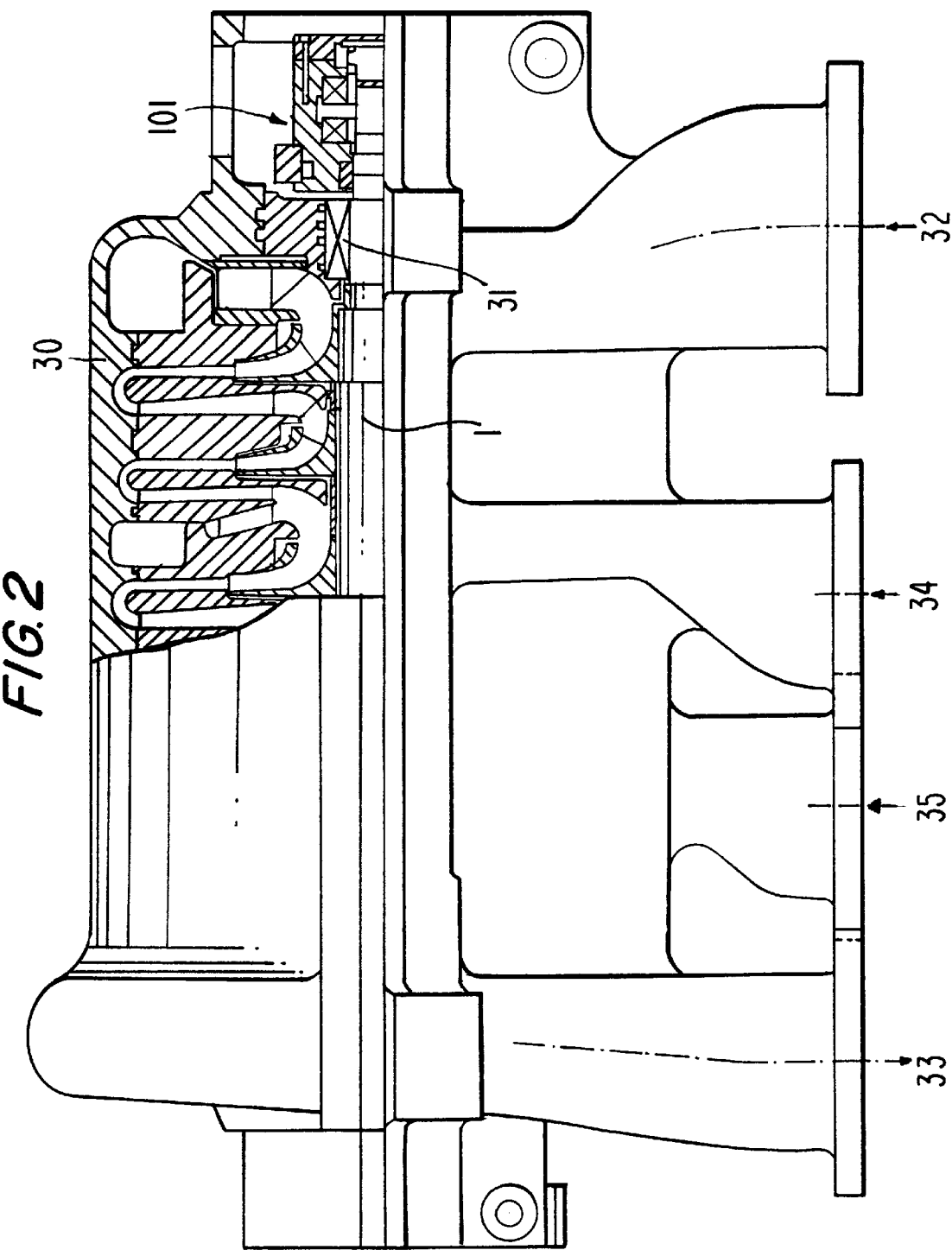
FIG. 2 is a side view, partially sectional showing an entire construction of a centrifugal compressor into which the damping device of FIG. 1 is incorporated.

The damping device of FIG. 1 as so constructed is provided at one end portion of a shaft (rotor) 1 of a centrifugal compressor, as shown in FIG. 2. In FIG. 2, numeral 101 designates the damping device shown in FIG. 1. Numeral 30 designates a casing and numeral 31 designates a seal portion. Numeral 32 designates a gas suction port, numeral 33 designates a gas discharge port and numerals 34 and 35 designate gas mixing ports.

Next, in the thrust bearing device shown in FIG. 1, the movable damping ring 71, the O-ring 72, the rotation set pin 73, the inner annular gap 75 and the outer annular gap 76 function likewise the movable ring 41, the O-ring 42, the rotation set pin 43, the inner annular gap 45 and the outer annular gap 46, respectively, as described with respect to FIG. 3. As the thrust collar 2 is integrated to the shaft 1 by an interference fit, as mentioned above, the damping effect of the damping device does not only act on the thrust collar but also extends to the integral unit of the shaft 1. Further, the elongated portion 22 of the thrust collar 2 which overhangs from the end portion of the shaft 1 is made in a larger diameter than the end portion of the shaft 1 and the vibration damping effect due to the damping device enhance in proportion to a square of the diameter, thus the damping effect obtained by this construction is large.

In this way, vibration is conveyed to the fluid film of high rigidity formed in the inner annular gap 75 and to the sealing fluid film formed in the outer annular gap 76, the vibration of the rotating object 1 is suppressed effectively.

According to the damping device of the present invention, the end portion of the thrust collar is elongated to the direction of the bearings so that an elongated portion which is hollow and overhangs from the end portion of the rotating object to be damped is formed and a stationary side of the damping device is associated with said elongated portion, thereby following effect can be obtained:

(1) A rotating portion of a large diameter can be formed at the overhanging portion without accompanying increase of vibration of the rotating object due to increase of weight of the shaft end portion, thereby a larger and more effective damping effect can be obtained as compared with a conventional damping device.

(2) The damping device according to the present invention is applicable also generally to a rotating machine having a type of seal other than an oil seal.

(3) The damping device according to the present invention can be provided additionally to an existing rotating machine having a vibration problem during operation, without re-manufacturing a shaft which is expensive and needs a long time for manufacture.

The foregoing invention has been described in terms of preferred embodiment. However, those skilled in the art will recognize that many variations of such embodiment exist. Such variations are intended to be within the scope of the present invention and the appended claims.

What is claimed is:

1. A damping device for damping vibration of a rotatable shaft having a shaft end portion, said damping device comprising:

a detachable thrust collar arranged on said rotatable shaft, said collar having an elongated portion extending in the direction of the axis of said shaft, said elongated portion being hollow and overhanging said shaft end portion; and said damping device having a stationary portion associated with said elongated portion of said thrust collar.

2. A damping device as claimed in claim 1, wherein said elongated portion of the thrust collar is formed larger in diameter than said shaft end portion.

3. A damping device for damping vibration of a rotor of a centrifugal compressor, said rotor having a rotor end portion, said damping device comprising:

a thrust collar arranged at said rotor end portion, said collar having an elongated portion extending in the direction of the axis of said shaft, said elongated portion being hollow and overhanging said rotor end portion; and said damping device having a stationary portion associated with an outer circumference of said elongated portion of said thrust collar.

4. A damping device as claimed in claim 3, wherein said elongated portion of the thrust collar is formed larger in diameter than said rotor end portion.

* * * * *